United States Patent
Nataniel et al.

(10) Patent No.: US 7,163,996 B2
(45) Date of Patent: *Jan. 16, 2007

(54) POLYAMIDES

(75) Inventors: Tina Nataniel, Saint Charles, IL (US); Dwight Heinrich, Aurora, IL (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/973,128

(22) Filed: Oct. 25, 2004

(65) Prior Publication Data

US 2005/0228165 A1   Oct. 13, 2005

Related U.S. Application Data

(60) Provisional application No. 60/524,553, filed on Nov. 24, 2003.

(51) Int. Cl.
*C08G 69/26* (2006.01)

(52) U.S. Cl. .................. 528/339.3; 528/324; 528/314; 528/345

(58) Field of Classification Search ............ 528/339.3, 528/324, 314, 310, 322, 335, 336, 340, 345
See application file for complete search history.

(56) References Cited

U.S. PATENT DOCUMENTS

| | | | |
|---|---|---|---|
| 3,565,837 A | 2/1971 | Drawert et al. | |
| 3,847,875 A | 11/1974 | Drawert et al. | |
| 4,218,351 A | 8/1980 | Rasmussen | |
| 4,409,373 A | 10/1983 | Wiemers et al. | |
| 4,663,371 A | 5/1987 | Arnold et al. | |
| 4,760,125 A | 7/1988 | Wiemers et al. | |
| 4,777,238 A * | 10/1988 | Leoni et al. | 528/339.3 |
| 4,791,164 A | 12/1988 | Wichelhaus et al. | |
| 4,810,772 A | 3/1989 | Leoni et al. | |
| 4,853,460 A | 8/1989 | Harman | |
| 4,882,414 A | 11/1989 | Wroczynski | |
| 4,912,196 A | 3/1990 | Leoni et al. | |
| 4,914,162 A | 4/1990 | Leoni et al. | |
| 5,138,027 A | 8/1992 | Van Beek | |
| 5,548,027 A | 8/1996 | Heucher et al. | |
| 5,719,255 A | 2/1998 | Heucher et al. | |
| 5,807,968 A | 9/1998 | Heinrich et al. | |
| 5,883,172 A | 3/1999 | Heucher et al. | |
| 5,922,831 A | 7/1999 | Heinrich et al. | |
| 5,948,880 A | 9/1999 | Fischer et al. | |
| 6,670,442 B1 | 12/2003 | Rossini et al. | |

FOREIGN PATENT DOCUMENTS

| | | |
|---|---|---|
| EP | 0 334 667 | 9/1989 |
| EP | 1 454 957 | 9/2004 |
| WO | WO 03/04078 | 6/2003 |

* cited by examiner

*Primary Examiner*—Patricia Hightower
(74) *Attorney, Agent, or Firm*—Stephen D. Harper

(57) ABSTRACT

Polyamides useful as hotmelt adhesives and having improved resistance to hydrocarbons such as gasoline are obtained by reacting a) an acid component containing at least one $C_6$ to $C_{22}$ aliphatic dicarboxylic acid and b) an amine component containing at least one straight chain alkylene diamine having from 2 to 8 carbon atoms and at least one heterocyclic secondary diamine. The amine component may optionally also contain at least one branched chain alkylene diamine having from 3 to 10 carbon atoms and/or at least one $C_{24}$ to $C_{48}$ dimer amine.

20 Claims, No Drawings

POLYAMIDES

CROSS-REFERENCE TO RELATED APPLICATIONS

This application claims priority from U.S. Provisional Application Ser. No. 60/524,553, filed 24 Nov. 2003, incorporated herein by reference in its entirety.

FIELD OF THE INVENTION

The invention relates to polyamides useful as, for example, hotmelt adhesives.

SUMMARY OF THE INVENTION

The present invention provides polyamides having an exceptionally desirable combination of properties, including high hardness and resistance to heat and solvents such as gasoline. The polyamides are formed by reacting a) an acid component comprising at least one $C_6$ to $C_{22}$ aliphatic dicarboxylic acid and b) an amine component comprising at least one straight chain alkylene diamine having from 2 to 8 carbon atoms and at least one heterocyclic secondary diamine. Improved low temperature properties such as increased flexibility are realized when the amine component is additionally comprised of at least one of at least one $C_{24}$ to $C_{48}$ dimer amine or at least one branched alkylene diamine having from 3 to 10 carbon atoms. The polyamides of the invention are particularly useful for bonding applications, such as, for example, in the filter industry (especially filters that are to be exposed to oil and/or gasoline) or in other applications where good hydrocarbon solvent resistance is needed.

DETAILED DESCRIPTION OF CERTAIN EMBODIMENTS OF THE INVENTION

The acid component contains one or more aliphatic dicarboxylic acids containing at least 6 (or at least 8, or at least 10) carbon atoms and, independently, not more than 22 (or not more than 20, or not more than 18) carbon atoms. Preferably, at least 50 mole % (more preferably at least 80 mole %; most preferably, at least 90 mole %) of the acid component is comprised of such aliphatic dicarboxylic acids. In one embodiment of the invention, the only acids used to prepare the polyamide are $C_6$ to $C_{22}$ aliphatic dicarboxylic acids. Linear as well as branched aliphatic dicarboxylic acids may be employed. Preferred aliphatic dicarboxylic acids for use in the present invention include compounds corresponding to the general formula HOOC—$R_1$—COOH where $R_1$ is a divalent, aliphatic, hydrocarbon radical having from 4 to 20 carbon atoms such as azelaic acid, sebacic acid, dodecanedicarboxylic acid, tetradecanedicarboxylic acid, hexadecanedicarboxylic acid, octadecanedicarboxylic acid and mixtures thereof. In one embodiment of the invention, sebacic acid is one of the $C_6$ to $C_{22}$ aliphatic dicarboxylic acids or essentially the only such dicarboxylic acid used in the acid component. In this embodiment, sebacic acid preferably comprises at least 50 mole % (more preferably, at least 80 mole %; most preferably, at least 90 mole %) of the aliphatic dicarboxylic acid(s) used. In another embodiment of the invention, dodecanedicarboxylic acid is one of the $C_6$ to $C_{22}$ aliphatic dicarboxylic acids or essentially the only such dicarboxylic acid used in the acid component. In this embodiment, dodecanedicarboxylic acid preferably comprises at least 50 mole % (more preferably, at least 80 mole %; most preferably, at least 90 mole %) of the aliphatic dicarboxylic acid(s) used. In still another embodiment of the invention, octadecanedicarboxylic acid is one of the $C_6$ to $C_{22}$ aliphatic dicarboxylic acids or essentially the only such dicarboxylic acid used in the acid component. In this embodiment, octadecanedicarboxylic acid comprises at least 50 mole % (more preferably, at least 80 mole %; most preferably, at least 90 mole %) of the aliphatic dicarboxylic acid(s) used. In yet another embodiment of the invention, at least two acids selected from the group consisting of octadecanedicarboxylic acid, sebacic acid, tetradecanedicarboxylic acid, hexadecanedicarboxylic acid and dodecanedicarboxylic acid are used as $C_6$ to $C_{22}$ aliphatic dicarboxylic acids or are essentially the only such dicarboxylic acids used in the acid component. Preferably, such mixture of different diacids comprises at least 50 mole % (more preferably, at least 80 mole %; most preferably, at least 90 mole %) of the aliphatic dicarboxylic acids used.

The amine component contains a mixture of amines comprised of at least one straight chain alkylene diamine having from 2 to 8 carbon atoms and at least one heterocyclic secondary diamine. To improve low temperature flexibility, at least one $C_{24}$ to $C_{48}$ dimer amine and/or at least one branched chain alkylene diamine having from 3 to 10 carbon atoms is or are additionally utilized as part of the amine component. However, the presence of moieties derived from such amines in the polyamide tends to adversely affect the resistance of the polyamide towards gasohol (gasoline blended with alcohol) and European gasoline formulations.

The straight chain alkylene diamine preferably corresponds to the formula:

where "n" is at least 2 and independently is not more than 8. Thus, examples of the useful straight chain alkylene diamines include ethylenediamine, 1,3-propylenediamine, tetramethylenediamine, pentamethylenediamine, hexamethylenediamine, octamethylenediamine, and mixtures thereof. In one embodiment of the invention, the straight chain alkylene diamine used is predominately (e.g., greater than 50 mole %; more preferably greater than 80 mole %; most preferably greater than 90 mole %) or essentially entirely ethylenediamine. In another embodiment of the invention, the straight chain alkylene diamine used is predominately (e.g., greater than 50 mole %; more preferably greater than 80 mole %; most preferably greater than 90 mole %) or essentially entirely hexamethylenediamine.

One or more $C_{24}$ to $C_{48}$ dimer amines (sometimes referred to as dimer diamines) may additionally be present in the amine component used to prepare the polyamide. Such materials are similar in composition and structure to dimerized fatty acids, but contain primary amino groups instead of carboxylic acid groups. They may be obtained by conversion of the carboxylic acid groups in dimerized fatty acids to nitrile groups and subsequent hydrogenation. Suitable dimer amines are available commercially under the trade name "Versamine" from Cognis Corporation and under the trade name "Kemamine" from Crompton Corporation. Preferably, the dimer amines are prepared from $C_{12}$ to $C_{24}$ (more preferably, $C_6$ to $C_{20}$; most preferably, $C_{18}$) unsaturated fatty acids, such as oleic acid, linoleic acid, linolenic acid, or mixtures thereof (as those mixtures of fatty acids derived from tall oil). In preferred embodiments of the invention, the dimer amine used contains at least 90 weight % diamine (i.e., 10 weight % or less of other materials such as monoamines and triamines).

The amine component is further comprised of one or more heterocyclic secondary diamines. Such compounds are preferably aliphatic and comprise at least one ring structure with secondary nitrogen atoms contained therein. Piperazine is a particularly preferred heterocyclic secondary diamine for use in preparing the polyamides of the present invention. Preferably, piperazine comprises at least 50 mole %, more preferably at least 80 mole %, most preferably at least 90 mole %, of the heterocyclic secondary diamine(s) present in the amine component.

The branched chain alkylene diamine which is optionally a part of the amine component preferably corresponds to the formula:

where "n" is 2 to 9 (preferably 3 to 7), and R is H (hydrogen) or lower (e.g., $C_1$–$C_4$) alkyl (subject to the proviso that at least one R group is an alkyl group). Thus, examples of the useful branched chain alkylene diamines are 1,2-propylenediamine, 1,3-propylenediamine, 2-methyl-1,5-pentanediamine, 5-methyl-1,9-nonanediamine, and trimethylhexamethylenediamine and mixtures thereof. Especially useful polyamides are obtained in accordance with this invention when the branched chain alkylene diamine used is predominately (e.g., greater than 50 mole %; more preferably greater than 80 mole %; most preferably greater than 90 mole %) or entirely 2-methyl-1,5-pentanediamine.

The equivalent ratios of the various diamines present in the amine component may be independently controlled within the following ranges, for example:

|     | Preferred     | More Preferred |
| --- | ---           | ---            |
| A:B | 1:0.4 to 1:1.3 | 1:0.6 to 1:1.1 |
| A:C | 1:0.4 to 1:1.3 | 1:0.6 to 1:1.1 |
| A:D | 1:0.8 to 1:2.3 | 1:1.2 to 1:1.9 |
| B:C | 1:0.5 to 1:1.5 | 1:0.8 to 1:1.3 |
| B:D | 1:0.9 to 1:2.7 | 1:1.4 to 1:2.3 |
| C:D | 1:0.9 to 1:2.7 | 1:1.4 to 1:2.3 |

A = straight chain alkylene diamine
B = heterocyclic secondary diamine
C = dimer amine
D = branched chain alkylene diamine In preferred variations of this embodiment of the invention, the moieties in the polyamide which are derived from the aliphatic dicarboxylic acid(s) represent from 40 to 55 mole percent of the total moieties (repeating units) in the polyamide. The moieties in the polyamide which are derived from the heterocyclic secondary diamine(s) may, in this embodiment, represent from 5 to 15 mole percent of the total moieties, for example. The moieties in the polyamide which are derived from the dimer amine(s) may, in this embodiment, represent from 5 to 15 mole percent of the total moieties in the polyamide, for example. In this embodiment, the moieties in the polyamide which are derived from the branched chain alkylene diamine(s) may, for example, represent from 8 to 27 mole percent of the total moieties in the polyamide.

In one embodiment of the invention, the equivalent ratios of the diamines present in the amine component are preferably controlled within the following ranges, for example:

|     | Preferred    | More Preferred |
| --- | ---          | ---            |
| A:B | 1:10 to 1:0.5 | 1:6 to 1:0.8  |

A = straight chain alkylene diamine
B = heterocyclic secondary diamine

In preferred variations of this embodiment of the invention, the moieties in the polyamide which are derived from the straight chain alkylene diamine(s) represent from 5 to 30 mole percent of the total moieties (repeating units) in the polyamide. The moieties in the polyamide which are derived from the heterocyclic secondary diamine(s) may, in this embodiment, represent from 20 to 45 mole percent of the total moieties, for example. In one variation of this embodiment of the invention, less than 5 mole percent of the moieties in the polyamide are derived from dimer amines. For example, the polyamide may contain contain essentially no moieties derived from dimer amines. In another variation, less than 5 mole percent of the moieties in the polyamide are derived from branched chain alkylene diamines. For example, the polyamide may contain essentially no moieties derived from branched chain alkylene diamines.

One embodiment of the present invention is a polyamide obtained by condensation polymerization of a mixture of monomers consisting essentially of sebacic acid, ethylenediamine, piperazine, at least one dimer amine and 2-methyl-1,5-pentanediamine. The equivalent ratios of the amine-containing reactants may be selected independently as follows, for example:

|     | Preferred      | More Preferred  |
| --- | ---            | ---             |
| A:B | 1:0.4 to 1:1.3 | 1:0.6 to 1:1.1  |
| A:C | 1:0.4 to 1:1.3 | 1:0.6 to 1:1.1  |
| A:D | 1:0.8 to 1:2.3 | 1:1.2 to 1:1.9  |
| B:C | 1:0.5 to 1:1.5 | 1:0.8 to 1:1.3  |
| B:D | 1:0.9 to 1:2.7 | 1:1.4 to 1:2.3  |
| C:D | 1:0.9 to 1:2.7 | 1:1.4 to 1:2.3  |

A = ethylenediamine
B = piperazine
C = dimer amine
D = 2-methyl-1,5-pentanediamine Another embodiment of the present invention is a polyamide obtained by condensation polymerization of a mixture of monomers consisting essentially of octadecanedicarboxylic acid, hexamethylenediamine and piperazine. Preferably, the equivalent ratio of hexamethylenediamine:piperazine is at least 0.1:1 or 0.2:1 and independently is no greater than 0.4:1 or 0.3:1.

Another embodiment of the present invention is a polyamide obtained by condensation polymerization of a mixture of monomers consisting essentially of a) one or more dicarboxylic acids selected from the group consisting of dodecanedicarboxylic acid and sebacic acid, b) hexamethylenediamine and c) piperazine. Preferably, the equivalent ratio of hexamethylenediamine:piperazine is at least 0.6:1 or 0.8:1 and independently is no greater than 1.4:1 or 1.2:1.

The number of free acid groups and/or free amine groups present in the polyamide are directly related to the relative amounts of the acid component and amine component involved in the polymerization reaction and the degree of completion of the reaction. For the above reasons, approximately stoichiometric amounts (typically with a slight excess of acid groups, e.g., a ratio of total acid to total amine groups of from about 1.001:1 to about 1.1:1, more typically from about 1.002:1 to about 1.05:1, and most typically from about 1.005:1 to about 1.03:1) based on the total number of available acid and amine groups should be used to prepare the polyamide of this invention and the reaction conditions should be selected to ensure completion or substantial completion of the amidation (condensation) reaction.

Generally speaking, polyamides in accordance with the invention that are acid-terminated tend to have better stability at elevated temperatures than the corresponding amine-terminated polyamides. However, the amine-terminated polyamides tend to exhibit better adhesion to substrate surfaces.

It is desirable that the polyamide be the result of as complete an amidation reaction as possible between the starting acid component and the amine component. Those skilled in the art will recognize that the degree of completion of the amidation process can be determined by evaluating the acid number and the amine number of the final polymer. The polyamide should have a relatively low acid number, typically less than about 40, more typically less than about 15, and even more typically less than about 10. Ideally, the amine number of the polyamide should be zero (0). However, it is often difficult, if not impossible, to reach complete reaction, and thus this value preferably should in practice be two or less.

The instant polyamides are prepared using conventional procedures and reaction conditions known to the art. It should be noted that while reference is made to acid and amine components for purposes of determining the relative amounts of each acid and amine used to prepare the polyamide, there is no need to form a separate premix of acids and a separate premix of amines, nor is it required that all reactants be charged together at the beginning of the reaction. In general, the acid and amine components are reacted until the final product has an acid value and an amine value less than 15 and even more preferably less than 10, with the reaction being generally conducted at temperatures from about 100° C. to about 300° C. for from about 1 to about 8 hours. Most often the reactions will be heated from 140° to 240° C. until the theoretical amount of water is evolved. Generally several hours are required to complete the reaction. The reaction is preferably conducted under an inert atmosphere, such as nitrogen, and during the final stages of the reaction a vacuum is applied to the system to facilitate removal of the final traces of water and any other volatile materials. Acid catalysts, such as phosphoric acid, and/or vacuum can be used, especially in the latter part of the reaction, to yield a more complete amidation reaction.

The polyamides obtained by the aforedescribed procedures may be used without further modification. The polyamide compositions of this invention may, however, be combined or modified with conventional additives widely known and used in the resin arts. For example, thermal stabilizers, antioxidants, UV stabilizers, plasticizers, tackifiers, nucleating agents, impact modifiers, flame retardants, antistatic agents, reinforcing agents, processing aids including mold release agents, lubricants and the like, as well as pigments, dyes, inorganic or organic fillers such as carbon black, talc, clay, mica and the like may usefully be included.

The polyamides of the present invention are particularly useful as hotmelt adhesives or components of hotmelt adhesives where good resistance to solvents, oil and/or fuel is needed. For example, the polyamides may be utilized in the assembly of fuel and oil filters and the like.

EXAMPLES

Polyamides in accordance with the invention are prepared by reacting the following materials (the amount stated for each component is in parts by weight):

| Component | Ex. 1 | Ex. 2 | Ex. 3 | Ex. 4 |
|---|---|---|---|---|
| Octadecanedioic Acid | — | 74.51 | — | — |
| Dodecanedioic Acid | — | — | 63.88 | — |
| Sebacic Acid | 52.00 | — | — | 60.94 |
| Ethylene Diamine | 3.66 | — | — | — |
| Hexamethylenediamine[1] | — | 7.63 | 22.45 | 24.39 |
| Piperazine (anhydrous) | 4.34 | 15.84 | 11.65 | 12.65 |
| $C_{36}$ Dimer Amine[2] | 27.45 | — | — | — |
| Branched Alkylene Diamine[3] | 10.54 | — | — | — |
| Octamine (Antioxidant) | 2.00 | — | — | — |
| NAUGARD 445[4] | — | 2.00 | 2.00 | 2.00 |
| Phosphoric Acid | 0.020 | 0.020 | 0.020 | 0.020 |

[1]70% in solvent
[2]VERSAMINE 551, equivalent weight 272, obtained from Cognis Corporation
[3]DYTEK A amine, equivalent weight 58, obtained from DuPont
[4]amine antioxidant, obtained from Uniroyal Chemical The blended materials are heated for 90 minutes under nitrogen at 227 degrees C. and then for an additional 60 minutes under vacuum at the same temperature to obtain the polyamide.

The polyamide of Example 1 exhibits good resistance to gasoline (American formulation) and water as well as good adhesion to substrates and good flexibility, but its resistance to gasohol and European formulated gasoline is not as good. The polyamide of Example 2 has improved resistance to gasohol as compared to the polyamide of Example 1. A high degree of resistance to all three types of fuel is achieved by the polyamides of Examples 3 and 4, but these polyamides exhibit lower flexibility and decreased adhesion to substrates as compared to the polyamide of Example 1.

What is claimed is:

1. A polyamide which is the reaction product of a) an acid component comprising one or more $C_6$ to $C_{22}$ aliphatic dicarboxylic acids, wherein at least 90 mole % of said acid component is comprised of said one or more $C_6$ to $C_{22}$ aliphatic dicarboxylic acids and b) an amine component comprising at least one straight chain alkylene diamine having from 2 to 8 carbon atoms and at least one heterocyclic secondary diamine.

2. A polyamide according to claim 1 wherein the amine component is additionally comprised of at least one branched chain alkylene diamine having from 3 to 10 carbon atoms.

3. A polyamide according to claim 1 wherein the amine component is additionally comprised of at least one $C_{24}$ to $C_{48}$ dimer amine.

4. A polyamide according to claim 1 wherein the amine component is additionally comprised of at least one $C_{24}$ to $C_{48}$ dimer amine and at least one branched chain alkylene diamine having from 3 to 10 carbon atoms.

5. A polyamide according to claim 1 wherein the amine component comprises piperazine.

6. A polyamide according to claim 1 wherein the amine component comprises piperazine and ethylenediamine.

7. A polyamide according to claim 1 wherein the amine component comprises 2-methyl-1,5-pentanediamine.

8. A polyamide according to claim 1 wherein the acid component comprises at least one $C_{10}$ to $C_{14}$ aliphatic dicarboxylic acid.

9. A polyamide according to claim 1 wherein the amine component comprises hexamethylenediamine.

10. A polyamide according to claim 1 wherein the acid component comprises sebacic acid.

11. A polyamide according to claim 1 wherein the amine component comprises at least one straight chain alkylene diamine having from 2 to 4 carbon atoms.

12. A polyamide according to claim 1 wherein the straight chain alkylene diamine is ethylenediamine.

13. A polyamide according to claim 1 wherein the amine component additionally comprises at least one $C_{32}$ to $C_{40}$ dimer amine.

14. A polyamide according to claim 1 wherein the amine component additionally comprises at least one $C_{36}$ dimer amine.

15. A polyamide according to claim 1 wherein the amine component comprises piperazine, ethylene diamine, and 2-methyl-1,5-pentanediamine.

16. A polyamide obtained by condensation polymerization of a mixture of monomers consisting essentially of sebacic acid, ethylenediamine, piperazine, at least one dimer amine and 2-methyl-1,5-pentanediamine.

17. A polyamide obtained by condensation polymerization of a mixture of monomers consisting essentially of octadecanedicarboxylic acid, hexamethylenediamine and piperazine.

18. A polyamide according to claim 17 wherein the equivalent ratio of hexamethylenediamine:piperazine is at least 0.1:1 and is no greater than to 0.4:1.

19. A polyamide obtained by condensation polymerization of a mixture of monomers consisting essentially of a) one or more dicarboxylic acids selected from the group consisting of dodecanedicarboxylic acid and sebacic acid, b) hexamethylenediamine and c) piperazine.

20. A polyamide according to claim 19 wherein the equivalent ratio of hexamethylenediamine:piperazine is at least 0.6:1 and independently is no greater than 1.4:1.

* * * * *